United States Patent [19]

Chu et al.

[11] 4,170,567
[45] Oct. 9, 1979

[54] PHOTOCHROMIC MERCURY COMPLEXES OF ASYMMETRICAL DIARYLTHIOCARBAZONES

[75] Inventors: Nori Y. C. Chu, Southbridge; Peter G. Piusz, Brimfield, both of Mass.

[73] Assignee: American Optical Corporation, Southbridge, Mass.

[21] Appl. No.: 796,213

[22] Filed: May 12, 1977

[51] Int. Cl.$^2$ ............ G02B 5/23; C09B 45/00
[52] U.S. Cl. ............ 252/300; 260/145 A; 260/148; 260/149; 350/354
[58] Field of Search ............ 252/300; 260/145 A, 260/148, 149; 350/160 P, 354

[56] References Cited

U.S. PATENT DOCUMENTS

| | | | |
|---|---|---|---|
| 3,519,635 | 7/1970 | Meriwether et al. | 260/149 |
| 3,666,352 | 5/1972 | Wagner et al. | 252/300 |

OTHER PUBLICATIONS

Pupko, L. A. et al., "Synthesis and Investigation of Unsymmetrical Diarylthiocarbazones Containing Alkylmercapto and Alkoxy Substituents," *J. Org. Chem., USSR* 1(1), pp. 115-117 (Jan. 1965).

Pupko, L. S. et al., "Synthesis and Investigation of Unsymmetrical Diarylthiocarbazones with Halo and Carboxy Substituents," *J. Org. Chem., USSR*, 1(4), pp. 736-739, (Apr. 1965).

Morrison, R. T. et al., *Organic Chemistry*, (2nd Edition), Allyn and Bacon, Inc., Boston, Mass., pp. 839-840, (1966).

Primary Examiner—Benjamin R. Padgett
Assistant Examiner—Deborah L. Kyle
Attorney, Agent, or Firm—Jeremiah J. Duggan; Alan H. Spencer; Stephen A. Schneeberger

[57] ABSTRACT

Light fatigue resistant, non-orange, photochromic mercury complexes of asymmetrical diarylthiocarbazones for use in making photochromic sunglass lenses, ski goggles, and the like. The compounds comprise the class of mono and bis mercury diarylthiocarbazonates wherein one aryl group is an aryl group substituted at the ortho position with an electron withdrawing group such as $CF_3$ and the other aryl group is different from the first and can comprise variously substituted or unsubstituted phenyl or naphthyl groups.

32 Claims, 2 Drawing Figures

PHOTOCHROMIC MERCURY COMPLEXES OF ASYMMETRICAL DIARYLTHIOCARBAZONES

BACKGROUND OF THE INVENTION

This invention relates to a class of compounds useful for imparting photochromic behavior to optically clear plastic lenses such as sunglass lenses. More particularly, it relates to a novel class of asymmetrical photochromic mercury complexes of diarylthiocarbazones.

Photochromic compounds become colored or change color upon being exposed to actinic electromagnetic radiation and then revert to their original color when the radiation is removed. Thus, an ophthalmic lens containing an operative photochromic compound has a luminous transmittance and/or color which varies depending on the intensity of ambient light. At present, it is believed that the only commercially successful photochromic lens comprises a glass matrix having fine silver halide particles dispersed therein. Lenses of this type are available under the trademark "Photogray" and have become increasingly popular since their introduction about 10 years ago.

In recent years, several ophthalmic quality plastic materials have been substituted for glass as a lens material. These too are becoming increasingly popular, and ophthalmic quality lenses of, for example, allyl diglycol carbonate, cellulose acetate Butyrate, cellulose acetate, polymethacylate, polymethylmethacrylate, and polycarbonate have become available. However, at the present time there are no commercially successful photochromic plastic lenses.

Since it is relatively easy to incorporate an organic compound into a plastic and since there are numerous known organic photochromic compounds, in general, efforts have been directed to the discovery or selection of an organic photochrome that can be incorporated into optically clear plastics to form a photochromic sunglass lens. However, despite the very large number of known photochromic compounds, a suitable photochrome is at this time not available. The most troublesome problem is the photolabile nature of the vast majority of the known photochromes. Thus, while many substances have been observed to undergo the photochromic process by darkening or changing color upon activation with incident radiation, and reverting toward their original color when the radiation is removed, the sensitivity and responsiveness to light of the vast majority of these compounds decreases with each cycle. This results in photochromic fatigue (light fatigue) and a relatively short useful life span of the photochrome.

The metal complexes of the diarylthiocarbazones, as a class, represent perhaps the most stable of all known organic photochromic compounds. The generic class of the compounds of this type are disclosed in U.S. Pat. No. 3,361,706 to Meriwether et al. However, the vast majority of the compounds falling within the class described by Meriwether are not suitable for the manufacture of a photochromic lens for use in snglasses or ski goggles.

This is because a successful photochrome must be characterized by a number of critical properties. Thus, to have optimal utility, an organic diarylthiocarbazono-metal complex must have an acceptable color in the unactivated state. In this regard, certain colors, e.g., orange, are not accepted by the public. Thus, a photochromic sunglass lens which is orange in either its activated or unactivated state would have no significant commercial impact. The rate of color change of a photochrome when exposed to radiation should be as high as possible. Obviously, a photochromic lens which takes hours or more to change color would have severely limited utility, as would a photochromic material which, for example, had to be placed in the dark before it reverted to its original unactivated state. The Meriwether patent mentioned above is helpful in this regard insofar as it teaches a method of accelerating the color changes of the diarylthiocarbazono-metal complexes.

Still another important property of the photochromic compound selected for use in sunglass lenses, as indicated above, is its photolability. Although the diarylthiocarbazonates are better than most other classes of photochromic compounds in this regard, most members of the class are not stable enough to continue to undergo activation and deactivation for a reasonable period of time.

In addition to these requirements, a successful photochromic compound must be suitable for incorporation into an optically clear plastic to produce a lens having a suitable light transmittance in both the activated and unactivated state. In this regard, it is obvious that photochromes which only marginally decrease the photo-transmittance on activation, or which absorb too much light, would have little utility.

Of the various possible metallic ions which are useable in the diarylthiocarbazone photochromic metal complexes, it has been discovered that mercury is by far the most suitable. However, the vast majority of these compounds absorb light at or above 485 nm in the unactivated state. This means that these photochromes have an orange to red hue which is clearly unacceptable for sunglass lenses. In fact, of the large number of mercury diarylthiocarbazone complexes known, it is believed that only three have absorption maxima below 485 nm, i.e., in the acceptable color range. These are phenyl mercury diphenylthiocarbazonate, which has an absorption maximum at about 475 nm, mercury bis [di (ortho) tolythiocarbazonate] which has an absorption maximum at 470 nm, and mercury bis [di (ortho-α, α, α-trifluoro) tolylthiocarbazonate], which has an absorption maximum at about 436 nm. However, the photostability of mercury bis [di (ortho) tolythiocarbazonate] is very poor. Accordingly, of all the mercury complexes of diarylthiocarbazones presently available, only phenyl mercury diphenylthiocarbazonate and mercury bis [di (ortho-α, α, α- trifluoro) tolythiocarbazonate] are correctly colored for use in sunglass lenses. The structural formulae of these latter two complexes are set forth below.

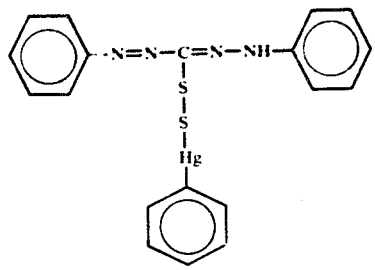

phenyl mercury diphenylthiocarbzonate

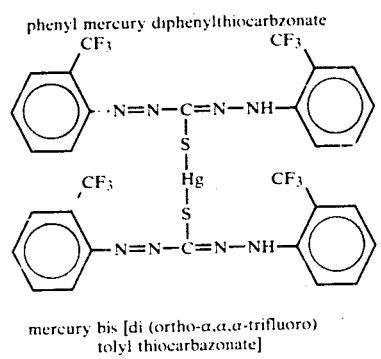

mercury bis [di (ortho-α,α,α-trifluoro) tolyl thiocarbazonate]

The former compound is an example of a "mono" mercury complex, the latter of a "bis" complex.

A photochromic sunglass lens having sufficient fatigue resistance utilizing phenyl mercury diphenylthiocarbazonate as its photochrome is tan in the unactivated state and gray in the activated state. Its luminous transmittance in the unactivated state is about 35 to 40%. If, as is much preferred, a polarizing sheet is laminated into the photochromic sunglass lens, the luminous transmittance will be further reduced to about 14–16%. This rather low luminous transmittance in the unactivated state, particularly when a polarizing sheet is also included in the lens, is considered too low to enable construction of an ideal product.

Although the photochromic sunglass lens utilizing the mercury bis [di (ortho-α, α, α-trifluoro) tolylthiocarbazonate] photochrome is higher in the luminous transmittance in the unactivated state (48–64%), its rate of darkening is rather slow, eight minutes being required to reach 90% of the photo-stationary value. This photochromic lens is either tan or green in the unactivated state, depending on the amount of blue dye incorporated in the host. Accordingly, of all the known mercury diarylthiocarbazonates, this compound is perhaps best suited for sunglass applications.

SUMMARY OF THE INVENTION

In accordance with invention, a large number of photochromic mercury complexes of diarylthiocarbazones useful as photochromes in sunglass lenses or ski goggles having absorption maxima below 485 nm have been discovered. Thus, the compounds of the invention obviate the critical threshold requirement of color which must be met before a particular photochrome may be considered useful for making photochromic sunglasses. In addition, several specific members of the class have been found to have other required characteristic properties useful for sunglass applications.

The family of compounds has resulted from two developments. First, it has been discovered that while varying the identity of the radical attached at a given position on the aryl groups of the molecule has, in general, little effect and certainly no predictable effect on the absorption maxima of the compounds produced, substitution of an electron withdrawing group in the ortho position of the aryl group has an unexpected and generally predictable effect. Specifically, such substitution results in a compound having a lower absorption maximum than when the same radical is substituted at other positions on the aryl groups. Also, such compounds have an absorption maximum that is lower than when other funtionalities are attached at the identical ortho position. Secondly, it has been discovered that asymmetrical diarylthiocarbazonates, that is, the compounds having different aryl groups at opposite ends of the molecule, have different absorption maxima than symmetrical diarylthiocarbazones utilizing either one of the groups. By combining these two discoveries, a class of photochromic mercury bis and mono diarylthiocarbazonates are provided which have absorption maxima in the blue range of the spectrum and which, consequently, show great promise for use in fabricating successful plastic photochromic sunglass lenses.

Thus, in one aspect, the invention provides photochromic asymmetrical mercury bis complexes of diarylthiocarbazones having an absorption maximum less than about 470 nm and having the formula:

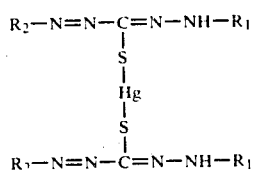

wherein one of $R_1$ and $R_2$ is any one of a large number of substituted or unsubstituted aryl radicals and the other one of $R_1$ and $R_2$ is an aryl group substituted at the ortho position with a radical selected from the group consisting of sulfonyl, alkylsulfonyl ($C_1$–$C_6$), carboxy, carboxyalkyl ($C_1$–$C_6$), aldehyde, keto alkyl ($C_1$–$C_6$), cyano (CN), trifluoromethyl, trifluoromethylsulfonyl, and perfluorothioalkoxy ($C_1$–$C_6$). The substituents at the positions on the aryl group other than the ortho position may be alkyl ($C_1$–$C_6$), halogen, or hydrogen.

According to another aspect of the invention, a second, closely related class of photochromic asymmetrical mercury complexes of diarylthiocarbazones are provided which have absorption maxima less than about 470 nm and have the formula:

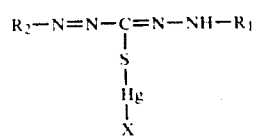

wherein X is selected from the group consisting of halogen, alkyl ($C_1$–$C_{10}$), and aryl ($C_6$–$C_{12}$) and wherein one of $R_1$ and $R_2$ is any one of a large number of substituted or unsubstituted aryl radicals. The other of $R_1$ and $R_2$ is an aryl group having the same critical substituents in the ortho position as outlined above.

The large number of aryl radicals referred to which are attached to the molecule opposite the ortho substituted aryl group include but are not limited to radicals selected from the group consisting of:

where $R_3$ is selected from the group consisting of hydrogen, alkyl ($C_1$-$C_4$), nitro, halo, alkoxy ($C_1$-$C_4$), aryloxy ($C_6$-$C_{10}$), hydroxy, carboxy, carboxyalkyl ($C_2$-$C_4$), alkoxycarbonyl ($C_2$-$C_6$), aryl ($C_6$-$C_{10}$), sulfamoyl, sulfo, arylamino ($C_6$-$C_{10}$), alkylamino ($C_1$-$C_4$), amino, acyl ($C_2$-$C_{11}$), acylamino ($C_1$-$C_{11}$), tetralyl perfluorothio ($C_1$-$C_4$), alkylthio ($C_1$-$C_4$), aldehyde, keto alkyl ($C_1$-$C_6$), cyano, and trifluoromethyl.

The presently preferred species of the invention is mercury bis [1 (or 5) phenyl-5-(or 1) (ortho-α, α, α-trifluoromethyl) phenyl thiocarbazonate]. This substance has a color, luminous transmittance, color change rate, and stability which make it well suited for the fabrication of a photochromic lens suitable for sunglass or ski goggle applications.

In accordance with the invention, one or more compounds as set forth above are incorporated in an optically clear resinous host to produce a non-orange colored photochromic sunglass lens or ski goggle. Preferably, the host is a resin selected from the group of known resins having optical utility consisting of, for example, cellulose acetate, cellulose acetate butyrate, polymethacrylate, polymethylmethacrylate, polystyrene, allyl diglycol carbonate, other polycarbonates, copolymers thereof, and compatible mixtures thereof. In its narrower sense, the invention comprises a photochromic lens for a sunglass or ski goggle comprising an optically clear plastic containing one or more members of the class of photochromic mercury diarylthiocarbazone complexes disclosed above.

It is therefore an object of the invention to provide photochromic mercury complexes, both of the bis and mono type, of diarylthiocarbazones which have absorption maxima in the unactivated state below about 485 nm.

Another object of the invention is to provide a class of asymmetrical mercury bis or mono complexes of diarylthiocarbazones having a color in the unactivated state in the yellow-tan range.

Another object of the invention is to provide a class of asymmetrical photochromic diarylthiocarbazonates having various electron withdrawing substituents attached to an aryl group at the ortho position.

Another object of the invention is to provide a photochromic colorant (photochrome) which can be incorporated into a plastic lens and which will thereafter retain its photochromic utility for a period of time longer than any presently available plastic photochromic lens.

Another object of the invention is to provide photochromic compounds which may be used in sunglass lenses containing a polarizing sheet.

Still another object of the invention is to provide photochromic compounds which are characterized by rapid color changes.

Another object is to provide plastic, photochromic, non-orange sunglass and ski goggle lens.

DESCRIPTION OF THE PREFERRED EMBODIMENT

Figure 1:
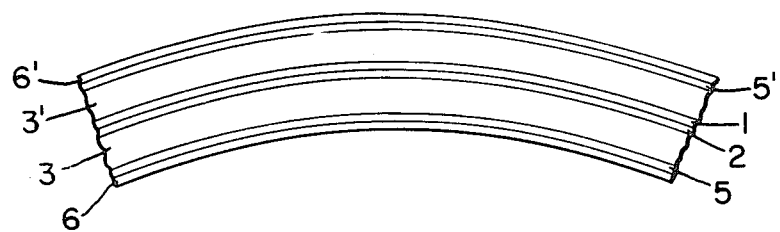
FIG. 1 illustrates a laminated, photochromic, polarized lens made in accordance with the invention.

The mercury complexes of diarylthiocarbazones may be generically described as set forth below:

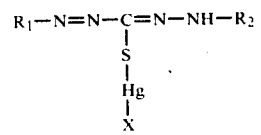

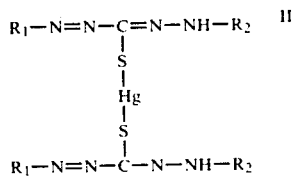

$R_1$ and $R_2$ in these formulae represent aryl groups, variously substituted or unsubstituted. However, it is believed that all species of this class which have heretofor been available have been symmetrical, that is $R_1$ and $R_2$ have been the same aryl groups. X can be a halogen such as fluorine, chlorine, bromine, iodine, etc., an alkyl group, in general, having up to about 10 carbon atoms, or an aryl group having between about 6 and 12 carbon atoms. Of the large number of compounds falling within the foregoing general formulae, only three are known to have an absorption maxima below about 485 nm. Accordingly, the vast majority of these compounds have an orange or orange-red color in the unactivated state and are clearly unsuitable for use in sunglass lenses or lenses for ski goggles.

However, it has been discovered that if $R_1$ and $R_2$ are different aryl groups, that is, if these compounds can be made asymmetrical, a series of compounds having absorption maxima different from similar symmetrical compounds are produced. Furthermore, it has been discovered that a blue shift in the absorption maximum can be induced if an electron withdrawing group is attached at the ortho position of an aryl group at either $R_1$ or $R_2$. This combination of molecular characteristics results in compounds having absorption maxima below about 470 nm.

If the radical substituted at the ortho position is $CF_3$, the bis complexes absorb at about 465 nm, which is 10 nm shorter than that of phenyl mercury diphenylthiocarbazonate. Substitution of other electron withdrawing groups at the ortho position will tend to further lower the absorption peak. Upon irradiation, the complexes appear grayish. This 10 nm difference in the position of the absorption peak between the bis complexes and the phenyl mercury diphenylthiocarbazonate will increase the luminous transmittance of a photochromic lens utilizing a bis complex of the invention as a photochrome by about 10-15% if the absorbance at peak absorption is unchanged. In addition, the useful lifespan of the photochromic properties of the lens will increase by a factor of about 2.5. This is because the fatigue rate of the bis complexes is smaller than that of the phenyl mercury diphenylthiocarbazonate by this factor. The particular aryl group selected for the other of $R_1$ and $R_2$ in general has little impact on these properties. The preferred other aryl group is thus a phenyl group.

In the case of the mono compounds, pleasant hues ranging from tan to olive green to green and adequate light fatigue resistance can be obtained when they are used to make photochromic lenses. When the substituent at the ortho position is an electron withdrawing group such as $CF_3$, the component has an unactivated color (455nm) closer to that of mercury bis [di(ortho-$\alpha,\alpha,\alpha$-trifluoro methyl) phenylthiocarbazonate]. However, the rate of darkening of the mono complexes of the instant invention is much faster than that of trifluoromethyl substituted symmetrical prior art compound. It takes only two minutes to reach 90% of the photostationary value with the compound of the instant invention as compared to 8 minutes for the prior art compound.

While the compounds of the invention include molecules in which either $R_1$ or $R_2$ comprises an aryl group substituted at the ortho position with certain disclosed electron withdrawing groups, it has been observed that the other substituents of the ortho substituted aryl are not critical. Furthermore, the other of $R_1$ and $R_2$ may comprise any one of a large number of substitutd or unsubstituted aryl groups. The identity of this other aryl group has only minimum effect on the absorption of the compound, this effect, in general, cannot be predicted on the basis of structural characteristics other than those set forth above. Likewise, the identity of X in the mono compound within the group set forth above has little effect on the color of the compounds produced or its photochromic utility.

The presently preferred synthesis scheme for producing these compounds is to prepare a nitroformaldehydrazone from an aryl amine, to react the nitroformaldehydrazone with a different aryl amine to form an asymmetrical nitroformazyl, to react the nitroformazyl with ammonium sulfide to form an asymmetrical thiocarbazide, and to treat the thiocarbazide with a base to produce an asymmetrical thiocarbazone. The asymmetrical thiocarbazone may then be complexed with mercury to form the mono complexes by reaction with aryl mercury chloride, alkyl mercury chloride, or a mercury halide. The bis complexes are produced by treating the asymmetrical thiocarbazone with mercuric chloride or mercuric acetate. All of the foregoing reactions are known.

The invention will be further understood from the following non-limiting examples.

EXAMPLE

SYNTHESIS OF ASYMMETRICAL DIARYLTHIOCARBAZONES

Coupling of diazonium compound with sodionitromethane is strongly pH dependent. At low pH (~1), one molecule of diazonium compound will couple with one molecule of sodionitromethane to form a nitroformaldehydrazone; while at higher pH (>4), two molecules of diazonium compound are coupled with one molecule of sodionitromethane to form a nitroformazyl. This pH dependence of coupling between diazonium compound and sodionitromethane may be used to synthesize asymmetrical diarylthiocarbazones. See, Pupko and Pelkis, J. Org. Chem., USSR 1, 115 and 736 (1965).

A. Preparation of Nitroformaldehydrazone from Aniline.

50 gm of aniline in 200 ml of concentratd HCl were diazotized with a solution of 36 gm of $NaNO_2$ in 100 ml of $H_2O$. A few grams of urea were added to remove excess $HNO_2$ after completion of the diazotization.

An ice-cold solution of 100 gm of NaAcO in 300 ml of $H_2O$ was added to the diazotized solution, followed by an alkaline nitromethane solution. The temperature of the diazotized solution was kept at $0 \leq °I \leq 5°$ C. throughout the whole operation. Thirty grams of NaOH in 200 ml of $H_2O$ and 40 grams of nitromethane in 150 ml of ethanol were used to make the alkaline nitromethane solution. The pH of the final solution should be about 1.

The yellow-orange precipitate was filtered and purified by recrystallization from water-ethanol mixture several times.

B. Preparation of Asymmetrical Nitroformazyl 16 gm of $\alpha,\alpha,\alpha$-trifluoro-o-toluidine were diazotized in 30 ml of concentrated HCl with a solution of 7 gm of $NaNO_2$ in 15 ml of $H_2O$. A solution of 17 gm of the nitroformaldehydrazone produced in A, in 150 ml of ethanol was added to the diazotized solution. The temperature of the solution was maintained below about 5° C. A cold solution of 30 gm of NaAcO in 100 ml of $H_2O$ was then added to the mixed solution. The maroon precipitate was filtered and washed with 1 liter of $H_2O$. The precipitate was purified by recrystallization from boiling ethanol. Twenty grams of asymmetrical nitroformazyl were obtained.

To substitute other electron withdrawing groups for the $CF_3$ of the asymmetrical nitroformazyl obtained as outlined above, the $\alpha,\alpha,\alpha$-trifluoro-o-toluidine is replaced with other ortho substituted aniline derivatives, having the formula:

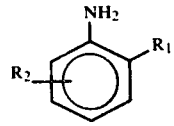

where $R_1$ is $SO_3H$, COOH, COOR (carboxyalkyl having 1 to 6 carbon atoms), CHO, COR (keto alkyl having 1-6 carbon atoms), CN, $SO_2CF_3$, or $SCF_3$. $R_2$ is an alkyl group ($C_1$-$C_6$), an alkoxy group ($C_1$-$C_6$), a halogen, or a hydrogen. Minor changes in reaction conditions may be necessary in particular cases. However, such modifications are within the skill of those in the art.

C. Conversion of Asymmetrical Nitroformazyl to Asymmetrical Thiocarbazone

The asymmetrical nitroformazyl was suspended in 200 ml of ethanol. A slightly excessive amount of $(NH_4)_2S$ solution was added to the suspension and the resulting clear solution was poured into 500 ml of iced water. The white precipitate was filtered and washed with 200 ml of $H_2O$.

The white precipitate was next dissolved in a solution of 8 gm NaOH in 500 ml of ethanol. The solution was kept cold by an ice-water bath and titrated with 1M HCl solution to pH ~4. The dark green precipitate was filtered. The dark green precipitate obtained was redissolved in a 500 ml of 5% NaOH in H₂O. The solution was filtered to remove undissolved impurities and the filtrate was titrated with 1 M HCl as described above. The dark green thiocarbazone precipitate was filtered and washed with plenty of H₂O several times.

In order to obtain a reasonably pure asymmetrical nitroformazyl, the nitroformaldehydrazone obtained in A has to be reasonably pure. The purification procedure for nitroformaldehydrazone is very time-consuming and the yield is low. An alternative route of making asymmetrical nitroformazyl with a CF₃ or other electron withdrawing group at the ortho position is to make the nitroformaldehydrazone from, e.g., α,α,α-trifluoro-o-toluidine. The desired nitroformaldehydrazone can be obtained in 90–95% yield and in sufficient purity such that no further purification is needed by the procedures described below.

D. Preparation of Nitroformaldehydrazone from α,α,α-trifluoro-o-toluidine 50 grams of α,α,α-trifluoro-o-toluidine was diazotized in 200 ml of concentrated HCl with 23 gm NaNO₂ in 100 ml of H₂O. Several grams of urea were used to remove excess HNO₂ after diazotization.

An ice-cold solution of 100 gm of NaAcO in 300 ml of H₂O was added to the diazotized solution, followed by an alkaline nitromethane solution. The temperature of the diazotized solution was kept at 0≦T≦5° C. The alkaline nitromethane solution was made from 30 gm of NaOH in 200 ml of H₂O and 40 gm nitromethane in 150 ml ethanol.

The yellow-orange precipitate produced was filtered and air-dried. Sixty-nine grams of nitroformaldehydrazone were obtained which correspond to a 95% yield.

The nitroformaldehydrazone obtained was used to prepare asymmetrical nitroformazyls and asymmetrical diarylthiocarbazones by the methods described in B and C above.

E. Complexing Asymmetrical Diarylthiocarbazones with Mercury

Mercury salts such as chloride, nitrate, and acetate in water are readily extracted by thiocarbazone dissolved in an organic solvent, such as methylene chloride or benzene, to form the mercury thiocarbazonate complex.

Thus, 4 gm of 1(or 5)-phenyl-5(or 1)-(ortho-α,α,α-tolfluoro)methyl phenyl thiocarbazone or other asymmetrical thiocarbazone of the invention and 5.4 gm of phenylmercury chloride were added to a 200 ml mixture of equal volumes of methylene chloride and water. The mixture was stirred for 1 hour and the methylene chloride layer was separated. One hundred milliliters of methanol were added to the methylene chloride solution to precipitate phenyl mercury thiocarbazonate. Four grams of the mono-mercury complex were obtained. The bis mercury complexes were obtained in the same manner, except that mercury chloride was used in place of phenyl mercury chloride.

Photochromic lenses have been made and tested using a preferred asymmetrical diarylthiocarbazono mercury complex of the invention. Two were made with phenyl mercury 1(or 5)- phenyl 5(or 1)-[ortho-α,α,α-trifluoro-methyl]phenylthiocarbazonate. The structural formula of this compound is set forth below.

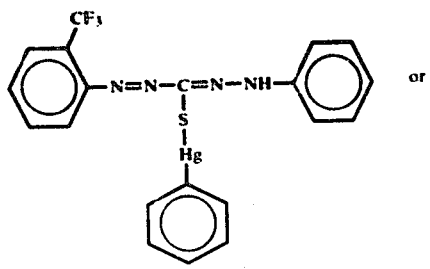

or

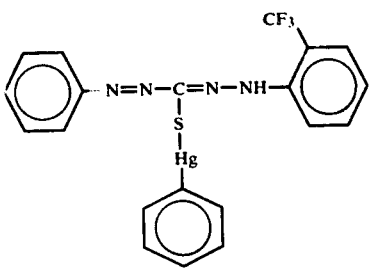

A third was made with mercury bis 1-(or 5)-phenyl 5(or 1)-[ortho-α,α,α-trifluoromethyl] phenyl thiocarbazonate. The structural formula of this compound is set forth below.

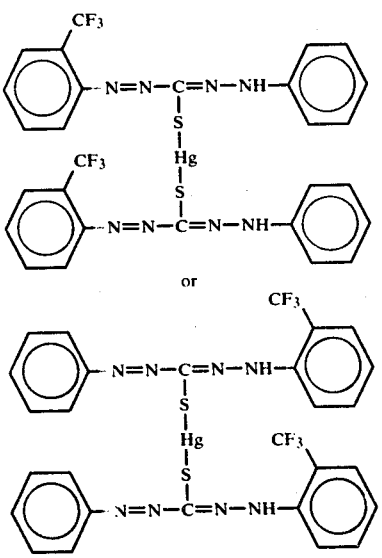

The makeup of three representative photochromic lenses and some of their more pertinent optical properties are set forth below.

|  | I | II | III |
| --- | --- | --- | --- |
| photochrome (grams) | 0.150 (mono) | 0.150 (mono) | 1.5 (bis) |
| Eastman Polyester blue GBT (grams) | 0.002 | 0.004 | — |
| Cyasorb UV24 (grams) | 2.0 | 2.0 | — |
| Uvinal D-50 (grams) | — | — | 23 |
| Host material | 100 g 10% CAB/CH₂Cl₂ | 100 g 10% CAB/CH₂Cl₂ | Tenite/Butyrate |
| Substrate material | Kodacel | Kodacel | — |
| Color before activation | light tan | olive green | light tan |
| Color after | | | |

| | I | II | III |
|---|---|---|---|
| activation | tan | greyish tan | grey |
| Transmittance before activation (%) | 63 | 55 | 55 |
| Transmittance after activation (%) | 15 | 10 | ~10 |
| Time to 90% activation | 2 min. | 2 min. | 2 min. |
| Time to 50% fading | 30 min. | 30 min. | 30 min. |
| Light stablity (hours) | 240 | 240 | 240 |

Eastman polyester blue is a stable passive blue dye. Cyasorb UV24 and Uvinal D-50 are commercially available benzophenone type UV light absorbers. DMP is dimethyl phthalate. CAB is cellulose acetate butyrate. Tenite Butyrate is an injection molding CAB pellet available from Eastman Kodak.

The lenses of the above examples demonstrate that a viable photochromic sunglass lens having a non-red color and other necessary properties can be provided by utilizing the asymmetrically photochromes of the invention. Of course, those skilled in the art will readily appreciate that many other compounds embodying the invention and various mixtures thereof may be used to advantage. Also, other optically clear plastics, copolymers and mixtures thereof may be utilized.

Three known methods of manufacturing lenses, but utilizing the compounds of the invention, have been used. These may be broadly described as the imbibition method, the lamination method, and the injection molding method.

In the imbibition method, a finished polarized lens, a polarized sheet without hard coating, a CAB sheet (e.g., Eastman Kodacel), or a lens made from another optically clear polymer is immersed in a photochromic dye bath heated to 70°–150° C. This is a simple operation but is somewhat limited because many of the photochromes of the invention are imbibed only over relatively extended periods of time.

In the lamination method, a 3 to 4 mil thick sheet (e.g., of cellulose acetate or CAB) comprising one or more photochromes of the invention, a suitable ultraviolet light absorber, and a plasticizer is cast from a solvent. The sheet is then laminated by conventional techniques between two 15 mil sheets of an optically clear compatible plastic, preferably CAB. An additional polarizing layer can be added intermediately to form a four-layer polarized photochromic laminate if desired. This method is the one utilized to fabricate the first two exemplary lenses set forth above.

In the injection molding method, a desired amount of a photochrome of the invention is mixed with an appropriate amount of Tenite Butyrate and a suitable ultraviolet light absorber such as Uvinal D-50 in a blender. The mixture is then injection-molded to form lenses using, for example, New Britain 175 ton molding machine. Specifically, 1.5 gm of mercury bis [1-(or 5)-phenyl-5(or 1)-ortho-$\alpha,\alpha,\alpha$-trifluoro) tolyl thiocarbazonate, 23 gm of Uvinal D-50, and 2.3 kg of Tenite Butyrate are uniformly mixed together by using a Waring blender. The mixture is then dried at 110° F. overnight before injection molding. The molding temperature is set at 350° F. and the mold temperature at 150° F. The finished lenses have a thickness of 32 mils. The lenses are then coated with an abrasion-resistant coating by the conventional method. Obviously, many other methods of manufacturing lenses using the photochromes of the invention will be usable.

In the drawing, FIG. 1 shows a typical lens of the invention made by the lamination method. A polarizing layer 1 and photochromic layer 2 are laminated between two optically clear plastic layers 3 and 3', consisting of, for example, cellulose acetate butyrate. The plastic layers, in turn, are laminated between a pair of double layered surface coverings consisting of ultraviolet light absorbing layers 5 and 5', and abrasion resistant coatings 6 and 6'.

Figure 2:
FIG. 2 illustrates a lens made by an injection molding technique using an optical plastic and a photochrome of the invention.

FIG. 2 illustrates a cast photochromic CAB lens protected by a pair of abrasion resistant coatings 7 and 7'.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An optically clear plastic, photochromic lens containing a photochrome selected from the group consisting of photochromic, asymmetrical mercury bis complexes of diarylthiocarbazones having absorption maxima less than about 470 nm, and having the formula:

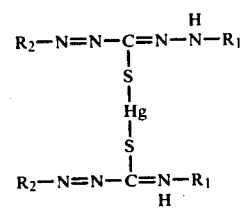

wherein one of $R_1$ and $R_2$ is a radical selected from the group consisting of substituted and unsubstituted aryl groups and the other one of $R_1$ and $R_2$ is an aryl group substituted in the ortho position with a radical selected from the group consisting of sulfonyl, alkylsulfonyl ($C_1$-$C_6$), carboxy, carboxy alkyl ($C_1$-$C_6$), aldehyde, keto alkyl ($C_1$-$C_6$), cyano, trifluoromethyl, trifluoromethylsulfonyl, and perfluorothioalkoxy ($C_1$-$C_6$).

2. The lens as set forth in claim 1 wherein the clear plastic comprises a plastic selected from the group consisting of cellulose acetate, cellulose acetate butyrate, polymethylmethacrylate, polymethacrylate, polystyrene, allyl diglycol carbonate, other polycarbonates, copolymers thereof, and compatible mixtures thereof.

3. The lens as set forth in claim 1 wherein said other one of $R_1$ and $R_2$ is substituted with a member selected from the group consisting of alkyl ($C_1$-$C_6$), halogen, alkoxy ($C_1$-$C_6$), and hydrogen.

4. The lens as set forth in claim 1 wherein said other one of $R_1$ and $R_2$ is a phenyl group substituted in the ortho position with a trifluoromethyl radical.

5. The lens as set forth in claim 4 wherein said substituted or unsubstituted aryl group is selected from the group consisting of:

wherein $R_3$ is a radical selected from the group consisting of hydrogen, alkyl ($C_1$-$C_4$), nitro, halo, alkoxy ($C_1$-$C_4$), aryloxy ($C_6$-$C_{10}$), hydroxy, carboxy, carboxyalkyl ($C_2$-$C_4$), alkoxycarbonyl $C_2$-$C_6$), aryl ($C_6$-$C_{10}$), sulfamoyl, sulfo, arylamino ($C_6$-$C_{10}$), alkylamino ($C_1$-$C_4$), amino, acyl ($C_2$-$C_{11}$), acylamino ($C_1$-$C_{11}$), tetralyl perfluorothio ($C_1$-$C_4$), alkylthio ($C_1$-$C_4$), aldehyde, keto alkyl ($C_1$-$C_6$), cyano, and trifluoromethyl.

6. An optically clear plastic, photochromic lens containing a photochrome selected from the group consisting of photochromic, asymmetrical mercury bis complexes of diarylthiocarbazones having absorption maxima at about 465 nm, and having the formula:

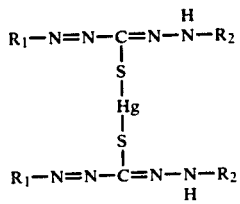

wherein one of $R_1$ and $R_2$ is phenyl and the other of $R_1$ and $R_2$ is ($\alpha, \alpha, \alpha$ trifluoromethyl) phenyl.

7. The lens as set forth in claim 6 wherein said plastic is selected from the group consisting of cellulose acetate, cellulose acetate butyrate, polymethylmethacrylate polymethacrylate, polystyrene, allyl diglycol carbonate, other polycarbonates, copolymers thereof, and compatible mixtures thereof.

8. An optically clear plastic, photochromic lens containing a photochrome selected from the group consisting of photochromic, asymmetrical mercury mono complexes of diarylthiocarbazones having an absorption maxima less than about 470 nm, and having the formula:

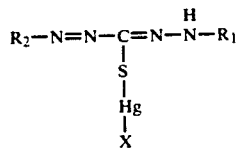

wherein X is selected from the group consisting of halogen, alkyl ($C_1$-$C_{10}$), and aryl ($C_6$-$C_{12}$), wherein one of $R_1$ and $R_2$ is selected from the group consisting of substituted and unsubstituted aryl groups and the other one of $R_1$ and $R_2$ is an aryl group substituted in the ortho position with a radical selected from the group consisting of sulfonyl, alkylsulfonyl ($C_1$-$C_6$), carboxy, carboxy alkyl ($C_1$-$C_6$), aldehyde, keto alkyl ($C_1$-$C_6$), cyano, trifluoromethyl, perfluorothioalkoxy ($C_1$-$C_6$) and trifluoromethylsulfonyl.

9. The lens as set forth in claim 8 wherein the clear plastic comprises a plastic selected from the group consisting of cellulose acetate, cellulose acetate butyrate, polymethylmethacrylate, polymethacrylate, polystyrene, allyl diglycol carbonate, other polycarbonates, copolymers thereof, and compatible mixtures thereof.

10. The lens as set forth in claim 8 wherein said other one of $R_1$ and $R_2$ is substituted with a member selected from the group consisting of alkyl ($C_1$-$C_6$), halogen, alkoxy ($C_1$-$C_6$), and hydrogen.

11. The lens as set forth in claim 8 wherein said other one of $R_1$ and $R_2$ is a phenyl group substituted in the ortho position with a trifluoromethyl radical.

12. The lens as set forth in claim 11 wherein said substituted or unsubstituted aryl group is selected from the group consisting of:

wherein $R_3$ is a radical selected from the group consisting of hydrogen, alkyl ($C_1$-$C_4$), nitro, halo, alkoxy ($C_1$-$C_4$), aryloxy ($C_6$-$C_{10}$), hydroxy, carboxy, carboxyalkyl ($C_2$-$C_4$), alkoxycarbonyl ($C_2$-$C_6$), aryl ($C_6$-$C_{10}$), sulfamoyl, sulfo, arylamino ($C_6$-$C_{10}$) alkylamino ($C_1$-$C_4$), amino, acyl ($C_2$-$C_{11}$), acylamino ($C_1$-$C_{11}$), tetralyl perfluorothio ($C_1$-$C_4$), alkylthio ($C_1$-$C_4$), aldehyde, keto alkyl ($C_1$-$C_6$), cyano, and trifluoromethyl.

13. An optically clear plastic photochromic lens containing a photochrome selected from the group consisting of photochromic, asymmetrical mercury mono complexes of diarylthiocarbazones having absorption maxima at about 455 nm, and having the formula:

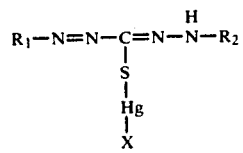

wherein X is selected from the group consisting of halogen, alkyl ($C_1$-$C_{10}$), and aryl ($C_6$-$C_{12}$), and wherein one of $R_1$ and $R_2$ is phenyl and the other one of $R_1$ and $R_2$ is ortho-($\alpha, \alpha, \alpha$-trifluoromethyl) phenyl.

14. The lens as set forth in claim 13 wherein said plastic is selected from the group consisting of cellulose acetate, cellulose acetate butyrate, polymethylmethacrylate, polymethacrylate, polystyrene, allyl diglycol carbonate, other polycarbonates, copolymers thereof, and compatible mixtures thereof.

15. Photochromic, asymmetrical mercury bis complexes of diarylthiocarbazones useful as photochromes in sunglass lenses and ski goggles, having absorption maxima less than about 470 nm, and having the formula:

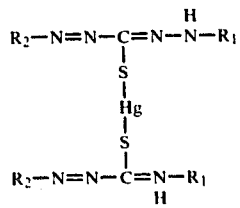

wherein one of $R_1$ and $R_2$ is a radical selected from the group consisting of substituted and unsubstituted aryl radicals and the other one of $R_1$ and $R_2$ is an aryl group substituted in the ortho position with a radical selected from the group consisting of sulfonyl, alkylsulfonyl ($C_1$-$C_6$), carboxy, carboxy alkyl ($C_1$-$C_6$), aldehyde, keto alkyl ($C_1$-$C_6$), cyano, trifluoromethyl, trifluoromethylsulfonyl, and perfluorothioalkoxy ($C_1$-$C_6$).

16. A complex as set forth in claim 15 dispersed in a lens comprising an optically clear plastic to form a non-orange photochromic lens.

17. The lens as set forth in claim 16 wherein the plastic is selected from the group consisting of cellulose acetate, cellulose acetate butyrate, polymethylmethacrylate, polymethacrylate, polystyrene, allyl diglycol carbonate, other polycarbonates, copolymers thereof, and compatible mixtures thereof.

18. The complexes as set forth in claim 15 wherein said other one of $R_1$ and $R_2$ is a phenyl group substituted in the ortho position with a trifluoromethyl radical.

19. The complexes as set forth in claim 18 wherein said substituted or unsubstituted aryl groups is selected from the group consisting of:

wherein $R_3$ is a radical selected from the group consisting of hydrogen, alkyl ($C_1$-$C_4$), nitro, halo, alkoxy ($C_1$-$C_4$), aryloxy ($C_6$-$C_{10}$), hydroxy, carboxy, carboxyalkyl ($C_2$-$C_4$), alkoxycarbonyl ($C_2$-$C_6$), sulfamoyl, sulfo, arylamino ($C_6$-$C_{10}$), alkyl amino ($C_1$-$C_4$), amino, acyl ($C_2$-$C_{11}$), acylamino ($C_1$-$C_{11}$), tetralyl perfluorothio ($C_1$-$C_4$), alkylthio ($C_1$-$C_4$), aldehyde, keto alkyl ($C_1$-$C_6$), cyano, and trifluoromethyl.

20. The complexes as set forth in claim 15 wherein said other one of $R_1$ and $R_2$ is substituted with a member selected from the group consisting of alkyl ($C_1$-$C_6$), halogen, alkoxy ($C_1$-$C_6$), and hydrogen.

21. The photochromic, asymmetrical mercury bis complexes of diarylthiocarbazones useful as photochromes in sunglass lenses and ski goggles, having absorption maxima at about 465 nm, and having the formula:

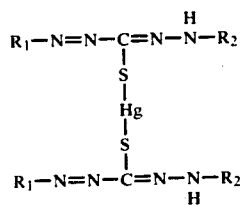

wherein one of $R_1$ and $R_2$ is phenyl and the other of $R_1$ and $R_2$ is ($\alpha, \alpha, \alpha$ trifluoromethyl) phenyl.

22. A complex as set forth in claim 21 dispersed in a lens comprising an optically clear plastic to form a non-orange photochromic lens.

23. The lens as set forth in claim 22 wherein said plastic is selected from the group consisting of cellulose acetate, cellulose acetate butyrate, polymethylmethacrylate, polymethacrylate, polystyrene, allyl diglycol carbonate, other polycarbonates, copolymers thereof, and compatible mixtures thereof.

24. The photochromic, asymmetrical mercury mono complexes of diarylthiocarbazones useful as photochromes in sunglass lenses and ski goggles, having an absorption maxima less than about 470 nm, and having the formula:

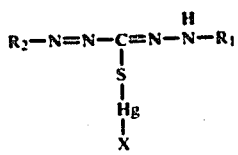

wherein X is selected from the group consisting of halogen, alkyl ($C_1$-$C_{10}$), and aryl ($C_6$-$C_{12}$), wherein one of $R_1$ and $R_2$ is selected from the group consisting of substituted and unsubstituted aryl groups and the other one of $R_1$ and $R_2$ is an aryl group substituted in the ortho position with a radical selected from the group consisting of sulfonyl, alkylsulfonyl ($C_1$-$C_6$), carboxy, carboxy alkyl ($C_1$-$C_6$), aldehyde, keto alkyl ($C_1$-$C_6$), cyano, trifluoromethyl, trifluoromethylsulfonyl, sulfonyl, and perfluorothioalkoxy ($C_1$-$C_6$).

25. A complex as set forth in claim 24 dispersed in a lens comprising an optically clear plastic to form a non-orange photochromic lens.

26. The lens as set forth in claim 25 wherein said plastic is selected from the group consisting of cellulose acetate, cellulose acetate butyrate, polymethylmethacrylate, polymethacrylate, polystyrene, allyl diglycol carbonate, other polycarbonates, copolymers thereof, and compatible mixtures thereof.

27. The complexes as set forth in claim 24 wherein said other one of $R_1$ and $R_2$ is a phenyl group substituted in the ortho position with a trifluoromethyl radical.

28. The complex as set forth in claim 27 wherein said substituted or unsubstituted aryl group is selected from the group consisting of:

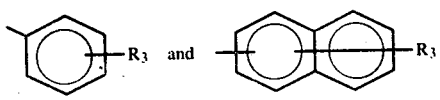

wherein $R_3$ is a radical selected from the group consisting of hydrogen, alkyl ($C_1$-$C_4$), nitro, halo, alkoxy ($C_1$-$C_4$), aryloxy, ($C_6$-$C_{10}$), hydroxy carboxy, carboxyalkyl ($C_2$-$C_4$), alkoxycarbonyl ($C_2$-$C_6$), aryl ($C_6$-$C_{10}$), sulfamoyl, sulfo, arylamino ($C_6$-$C_{10}$), alkylamino ($C_1$-$C_4$), amino, acyl, ($C_2$-$C_{11}$) acylamino ($C_1$-$C_{11}$) tetralyl perfluorothio ($C_1 14$ $C_4$), alkylthio ($C_1$-$C_4$), aldehyde, keto alkyl ($C_1$-$C_6$), cyano, and trifluoromethyl.

29. The complexes as set forth in claim 24 wherein said other one of $R_1$ and $R_2$ is substituted with a member selected from the group consisting of alkyl ($C_1$-$C_6$), halogen, alkoxy ($C_1$-$C_6$), and hydrogen.

30. The photochromic, asymmetrical mercury mono complexes of diarylthiocarbazones useful as photochromes in sunglass lenses and ski goggles, having absorption maxima at about 455 nm, and having the formula:

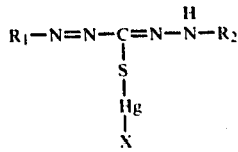

wherein X is selected from the group consisting of halogen, alkyl ($C_1$-$C_{10}$), and aryl ($C_6$-$C_{12}$) and wherein one of $R_1$ and $R_2$ is phenyl and the other one of $R_1$ and $R_2$ is ortho-($\alpha, \alpha, \alpha$-trifluoromethyl) phenyl.

31. The complex as set forth in claim 30 dispersed in a lens comprising an optically clear plastic to from a non-orange photochromic lens.

32. The lens as set forth in claim 31 wherein said plastic is selected from the group consisting of cellulose acetate, cellulose acetate butyrate, polymethylmethacrylate, polymethacrylate, polystyrene, allyl diglycol carbonate, other polycarbonates, copolymers thereof, and compatible mixtures thereof.

* * * * *